US012761006B2

(12) United States Patent
Raji et al.

(10) Patent No.: US 12,761,006 B2
(45) Date of Patent: Oct. 13, 2026

(54) UNMANNED VEHICLE WITH MULTIPLE PAYLOAD PLATFORMS

(71) Applicant: Ensign-Bickford Aerospace & Defense Company, Simsbury, CT (US)

(72) Inventors: Edris Raji, Simsbury, CT (US); Kurt Nelson, Simsbury, CT (US); Matthew Bragoni, Granby, CT (US); Andrew M. Kochanek, Suffield, CT (US); John Fiske, Southington, CT (US); Craig Boucher, Simsbury, CT (US); John A. Graham, Middletown, CT (US); Jarrett Jacobsen, Weatogue, CT (US); John Benner, Barkhamsted, CT (US); Scott Crespi, West Simsbury, CT (US); Michael Ronzello, Avon, CT (US); Glen Smith, St. Augustine, FL (US)

(73) Assignee: Ensign-Bickford Aerospace & Defense Company, Simsbury, CT (US)

( * ) Notice: Subject to any disclaimer, the term of this patent is extended or adjusted under 35 U.S.C. 154(b) by 588 days.

(21) Appl. No.: 18/133,942

(22) Filed: Apr. 12, 2023

(65) Prior Publication Data

US 2023/0273003 A1 Aug. 31, 2023

Related U.S. Application Data

(63) Continuation of application No. 17/712,447, filed on Apr. 4, 2022, now Pat. No. 11,650,036.

(Continued)

(51) Int. Cl.

| | |
|---|---|
| ***F42C 15/42*** | (2006.01) |
| ***B64D 1/04*** | (2006.01) |

(Continued)

(52) U.S. Cl.

CPC ................ *F42C 15/42* (2013.01); *B64D 1/04* (2013.01); *B64U 10/13* (2023.01); *F42C 11/006* (2013.01);

(Continued)

(58) Field of Classification Search

None

See application file for complete search history.

(56) References Cited

U.S. PATENT DOCUMENTS

| | | | |
|---|---|---|---|
| 6,840,480 | B2 | 1/2005 | Carroll |
| 8,089,033 | B2 | 1/2012 | Zank et al. |

(Continued)

FOREIGN PATENT DOCUMENTS

| | | | | |
|---|---|---|---|---|
| CN | 112027089 A | * 12/2020 | | B64D 1/06 |
| DE | 102019126372 A1 | 4/2021 | | |
| EP | 0149380 A1 | 7/1985 | | |

OTHER PUBLICATIONS

CN 112027089 A English Translation (Year: 2020).*

(Continued)

*Primary Examiner* — Reginald S Tillman, Jr.

(74) *Attorney, Agent, or Firm* — McCarter & English, LLP; Dave S. Christensen

(57) ABSTRACT

An unmanned vehicle and a method of operating the vehicle are provided. The vehicle includes a fuselage and at least one thrust device coupled to the fuselage. A first payload module having an first attachment plate is fixedly coupled to the fuselage, the first payload module further having a first control module removably coupled to the first attachment plate and a first payload having a first energetic element. A second payload module having an second attachment plate is fixedly coupled to the fuselage adjacent the first payload module, the second payload module further having a second control module removably coupled to the second attachment plate and a second payload having a second energetic element.

18 Claims, 16 Drawing Sheets

Related U.S. Application Data

(60) Provisional application No. 63/220,700, filed on Jul. 12, 2021.

(51) Int. Cl.

| | |
|---|---|
| ***B64U 10/13*** | (2023.01) |
| ***B64U 101/15*** | (2023.01) |
| ***F42C 11/00*** | (2006.01) |
| ***F42C 11/06*** | (2006.01) |

(52) U.S. Cl.

CPC .......... *F42C 11/06* (2013.01); *B64U 2101/15* (2023.01); *B64U 2201/20* (2023.01)

(56) References Cited

U.S. PATENT DOCUMENTS

| | | | | |
|---|---|---|---|---|
| 10,322,820 | B2 | 6/2019 | Husain et al. | |
| 11,067,374 | B2 | 7/2021 | Hill | |
| 11,242,147 | B2 | 2/2022 | Zvara | |
| 11,396,375 | B2 * | 7/2022 | Teetzel | B64U 50/39 |
| 11,460,273 | B2 * | 10/2022 | Livingstone | F41G 9/02 |
| 11,650,036 | B2 | 5/2023 | Raji et al. | |
| 11,754,380 | B2 * | 9/2023 | Benson | F41A 21/36 89/37.16 |
| 2009/0212157 | A1 | 8/2009 | Arlton et al. | |
| 2013/0304282 | A1 | 11/2013 | Beggs et al. | |
| 2020/0115055 | A1 | 4/2020 | Kuperman | |
| 2022/0161928 | A1 | 5/2022 | Scott | |
| 2022/0320669 | A1 | 10/2022 | Gil et al. | |
| 2023/0273002 | A1 | 8/2023 | Raji et al. | |

OTHER PUBLICATIONS

U.S. Appl. No. 17/712,447, filed Apr. 4, 2022, U.S. Pat. No. 11,650,036, Issued.

U.S. Appl. No. 18/133,897, filed Apr. 12, 2023, Pending.

European Office Action for Application No. 22922467.0, dated May 16, 2025, 7 pages.

* cited by examiner

UNMANNED VEHICLE WITH MULTIPLE PAYLOAD PLATFORMS

CROSS-REFERENCE TO RELATED APPLICATIONS

The present application is a continuation application of U.S. patent application Ser. No. 17/712,447 filed on Apr. 4, 2022, which is a nonprovisional application of, and claims the benefit of, U.S. Provisional Application 63/220,700 entitled "Payload Platform For Unmanned Vehicles" filed on Jul. 12, 2021, the contents of which is incorporated by reference.

BACKGROUND

The present invention relates generally to a system and method for delivering a weapons system with an unmanned vehicle, more specifically, to a system and method for mounting and deploying a weapons system autonomous or semi-autonomous vehicles.

Autonomous or semi-autonomous vehicles, also referred to as unmanned aerial vehicles (UAVs), remotely piloted aircraft (RPA) and autonomous ground vehicle (UGVs), are a small, typically portable, vehicle that have found a variety of uses in commercial and military application, such as but not limited to surveying, surveillance, aerial photography, and package delivery. A UAV typically consists of a body, a device such as a camera, a navigation system, and a propulsion system. The propulsion system usually consists of a plurality of rotors (e.g. four) that generate lift in the same manner as a helicopter. The vehicle is launched and is either guided by an operator or follows a path using navigation techniques to an end location. The vehicle then performs a task (e.g. photographs an area) and then returns to a landing site. In the case of UAV's and RPA's that include ordnance, the vehicle was expendable and did not return from the mission.

Accordingly, while existing autonomous or semi-autonomous vehicles are suitable for their intended purposes the need to improvement remains, particularly in providing a weapons platform having the features described herein.

SUMMARY

Embodiments include a system that is mountable to an unmanned vehicle. The system includes an attachment plate configured to couple to the unmanned vehicle, the attachment plate having a first feature. A control module is configured to removably couple to the attachment plate, the control module having one or more processors and a power source, the control module having a pin arranged to move from a first position to a second position when the control module is coupled to the attachment plate, the one or more processors being energized when the pin is moved from the first position to the second position. A payload having an energetic element is provided, the payload being coupled to the control module.

In addition to one or more of the features described herein, or as an alternative, further embodiments of the system may include the pin being removable from the control module in the second position.

In addition to one or more of the features described herein, or as an alternative, further embodiments of the system may include the pin further having a key FOB, the key FOB being configured to operably couple to a control device, the control device being remote from the control module.

In addition to one or more of the features described herein, or as an alternative, further embodiments of the system may include the control module further having a communications circuit that is operably coupled to the one or more processors and is coupled to communicate with the control device.

In addition to one or more of the features described herein, or as an alternative, further embodiments of the system may include the control device being coupled to communicate with the communications circuit in response to the key FOB being operably coupled to the control device.

In addition to one or more of the features described herein, or as an alternative, further embodiments of the system may include the control module further having a first static arming inhibit element operably coupled to the one or more processors, the one or more processors being configures to close the first static arming inhibit element in response to a first signal from the control device.

In addition to one or more of the features described herein, or as an alternative, further embodiments of the system may include the control module further having a solenoid operably coupled to the one or more processors and the energy source, the solenoid having a plunger that is movable from an extended position to a retracted position, the plunger being coupled to a second feature on the attachment plate, the control module being decoupled from the attachment plate when the plunger is in the retracted position.

In addition to one or more of the features described herein, or as an alternative, further embodiments of the system may include the one or more processors being further configured to initiate a timer in response to the decoupling of the control module from the attachment plate.

In addition to one or more of the features described herein, or as an alternative, further embodiments of the system may include the one or more processors being further configured to close a dynamic arming inhibit element in response to an expiration of the timer, the dynamic arming inhibit element being electrically coupled to the energy source.

In addition to one or more of the features described herein, or as an alternative, further embodiments of the system may include the control module having a high voltage capacitor operably coupled to the dynamic arming inhibit element and to a low energy exploding foil initiator, the low energy exploding foil initiator being electrically coupled between the dynamic arming inhibit and the energetic element.

In addition to one or more of the features described herein, or as an alternative, further embodiments of the system may include the one or more processors being further configured to close a firing switch in response to a third signal from the control device, the firing switch being electrically coupled between the high voltage capacitor and the low energy exploding foil initiator.

In addition to one or more of the features described herein, or as an alternative, further embodiments of the system may include the energetic element being one of fragmentary rounds, high explosives, thermite, or shaped charges.

Further embodiments include a method of deploying a payload from an unmanned vehicle. The method includes coupling an attachment plate to the drone, the attachment plate having a first feature. A control module is coupled to the attachment plate, the control module having a pin. The pin is moved from a first position to a second position with the first feature in response to attaching the control module to the attachment plate. One or more processors are energized with an energy source when the pin is in the second position.

In addition to one or more of the features described herein, or as an alternative, further embodiments of the method may include removing the pin from the control module when the pin is in the second position; and coupling a key FOB on the pin to a control device.

In addition to one or more of the features described herein, or as an alternative, further embodiments of the method may include the control device being coupled to communicate with a communications circuit in the control module when the key FOB is coupled to the control device, the communications circuit being operably coupled to the one or more processors.

In addition to one or more of the features described herein, or as an alternative, further embodiments of the method may include transmitting a first signal from the control device to the communications circuit and closing a first static arming inhibit element in response to receiving the first signal.

In addition to one or more of the features described herein, or as an alternative, further embodiments of the method may include transmitting a second signal from the control device to the communications circuit; retracting a solenoid plunger disposed in the control module in response to receiving the second signal; decoupling the control module from the attachment plate in response to retracting the solenoid plunger; and initiating a timer in response to decoupling the control module.

In addition to one or more of the features described herein, or as an alternative, further embodiments of the method may include closing a dynamic arming inhibit element and flowing electrical power from the energy source to a high voltage capacitor in response to expiration of the timer; transmitting a third signal from the control device to the communications circuit; and closing a firing switch in response to receiving the third signal.

In addition to one or more of the features described herein, or as an alternative, further embodiments of the method may include activating an energetic element with a low energy exploding foil initiator in response to closing the firing switch.

Additional features are realized through the techniques of the present invention. Other embodiments and aspects of the invention are described in detail herein and are considered a part of the claimed invention. For a better understanding of the invention with the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features of embodiments of the invention are apparent from the following detailed description taken in conjunction with the accompanying drawings in which:

DETAILED DESCRIPTION

Embodiments of the present disclosure are directed to a system for mounting a weapons system to an unmanned vehicle. Embodiments further include a system that is mountable to different models of unmanned vehicles. Still further embodiments provide a system that operates independently from the unmanned vehicle and does not draw power, telemetry, or data from the unmanned vehicle.

It should be appreciated that while embodiments herein refer to an unmanned aerial vehicle (UAV), this is for example purposes and the claims should not be so limited. In other embodiments, the unmanned vehicle may be an RPA, an UGV, or a surface or sub-surface watercraft for example. Further, the unmanned vehicle may be autonomous, semi-autonomous, or operator controlled.

Figure 1:
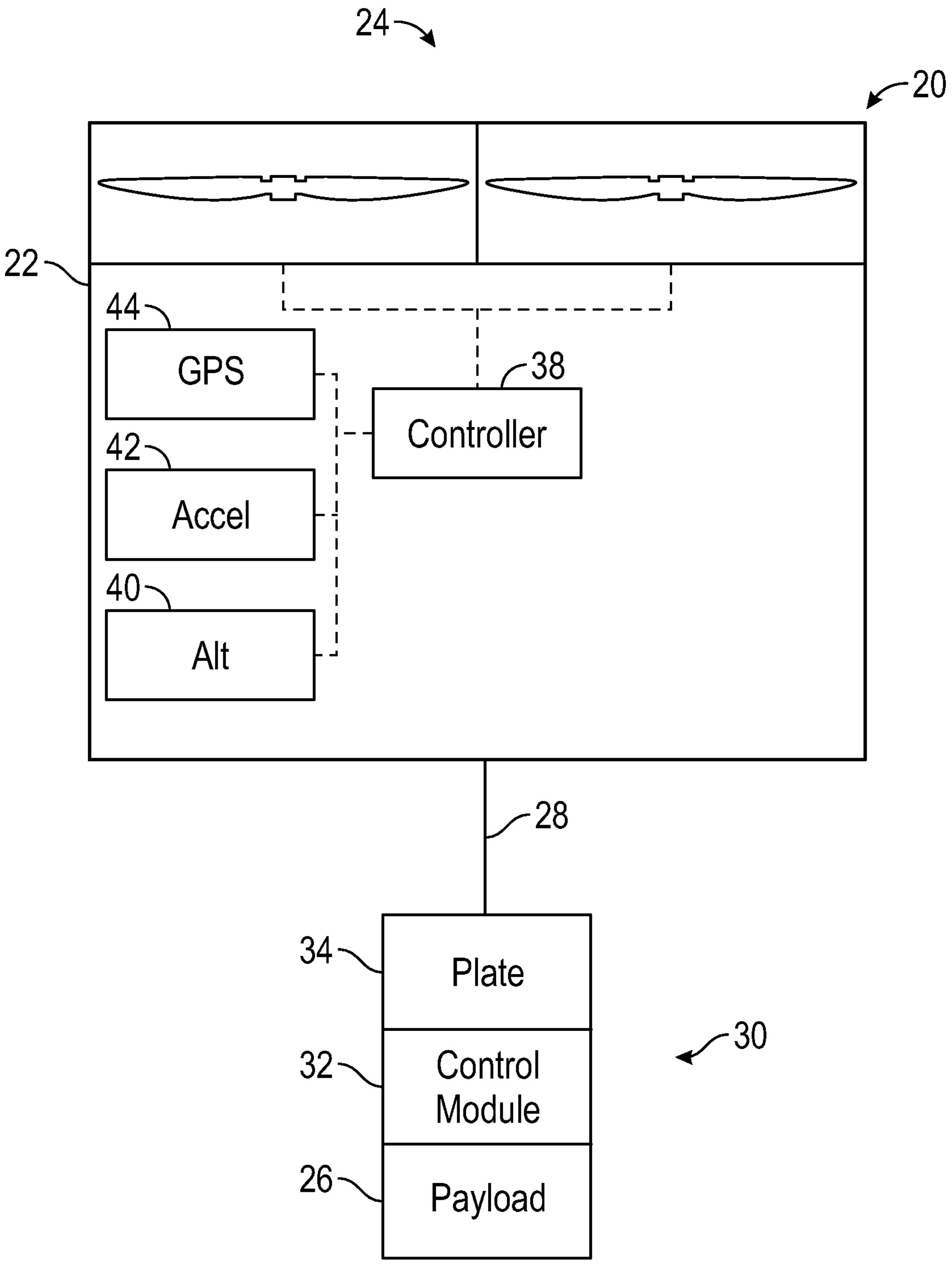
FIG. 1 depicts a block diagram of an autonomous or semi-autonomous vehicle having a weapons platform in accordance with an embodiment of this disclosure.

Referring now to FIG. 1, an embodiment is shown of an autonomous drone 20 or unmanned aerial vehicle. As used herein, the term "drone" refers to an aerial, ground, or water vehicle capable to operating autonomously or semi-autonomously from a human operator to perform a predetermined function, such as deliver a payload or package for example. In some embodiments, the drone 20 may also be operated by the human operator. The drone 20 includes a fuselage 22 that supports at least one thrust device 24. In an embodiment, the drone 20 includes a plurality of thrust devices 24A, 24B, such as four thrust devices arranged about the periphery of the fuselage 22. In an embodiment, the thrust devices 24 include propeller member that rotates to produce thrust. The thrust devices 24 may be configurable to provide both lift (vertical thrust) and lateral thrust (horizontal thrust). The vertical and horizontal components of the thrust allow the changing of the altitude, lateral movement and orientation (attitude) of the drone 20.

In the exemplary embodiment, the fuselage 22 and thrust devices 24 are sized and configured to carry a system 30 having a payload 26. The payload 26 being releasably coupled from the fuselage 22 during operation. As will be discussed in more detail herein, the system 30 further includes a payload control module 32 and an attachment plate 34. The attachment plate 34 includes a mechanical connection 28 that fixedly and removable couples the plate to the drone 20. The mechanical connection 28 may include a means, such as multiple bolt hole patterns for example, that allows the plate 34 to be coupled to a variety of different unmanned vehicles. The mechanical connection 28 further allows for the removal of the system 30, such as in the event that either the drone 20 or the system 30 is damaged. As discussed in more detail herein, the attachment plate further includes one or more features that allow the payload to be at least partially armed and allow the payload to be releasably coupled to the attachment plate 34.

The drone 20 includes a controller 38 having a processing circuit. The controller 38 may include processors that are responsive to operation control methods embodied in application code, such as for navigating the drone 20. These methods are embodied in computer instructions written to be executed by the processor, such as in the form of software. The controller 38 is coupled transmit and receive signals from the thrust devices 24, the transfer member 34 and the coupling device 36 to determine and change their operational states (e.g. extend transfer member 34, change polarity of coupling device 36, adjust lift from thrust devices 24). The controller 38 may further be coupled to one or more sensor devices that enable to the controller to determine the position, orientation and altitude of the drone 20. In an embodiment, these sensors may include an altimeter 40, a gyroscope or accelerometers 42 or a global positioning satellite (GPS) system 44.

Figure 2:
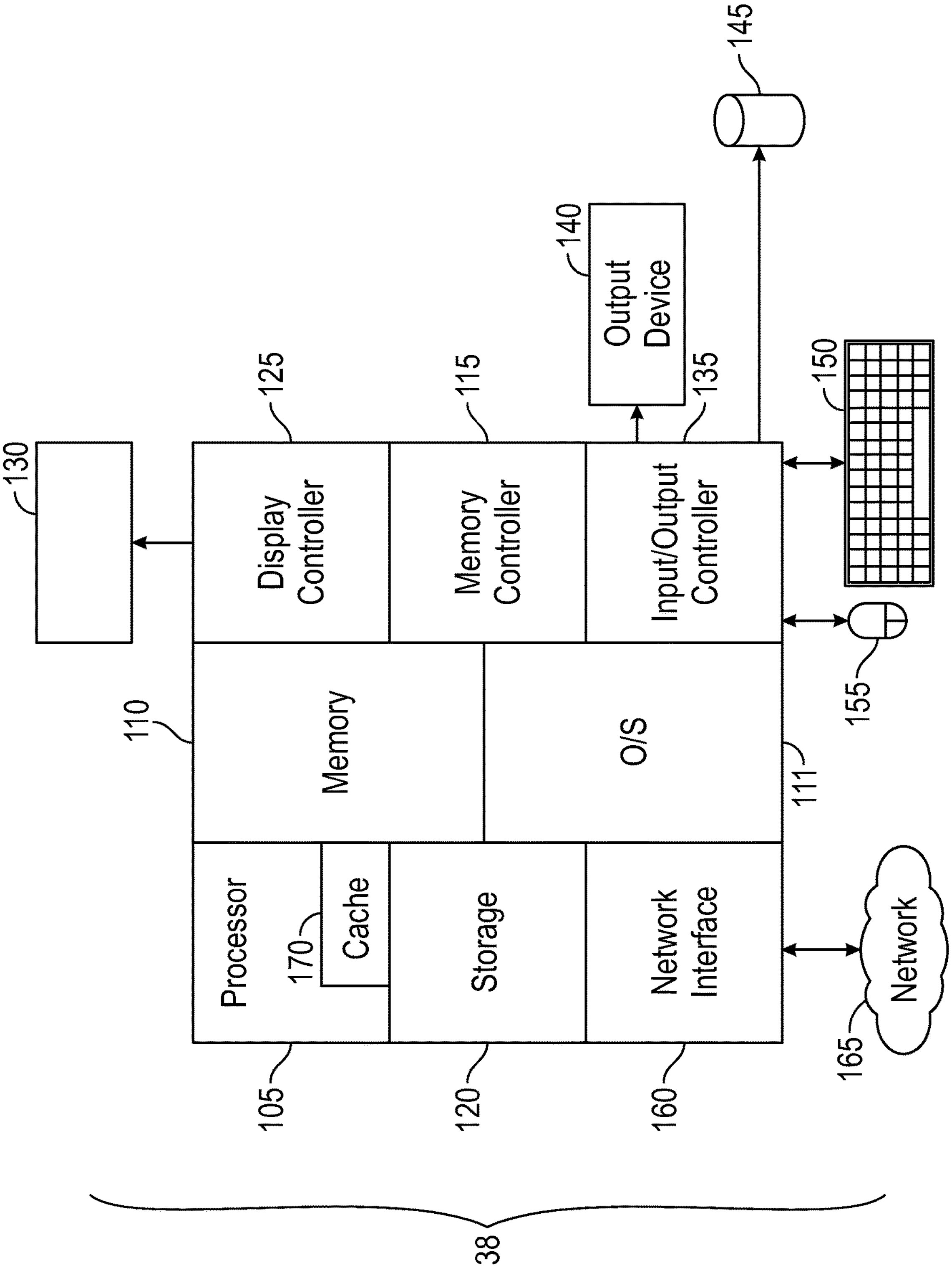
FIG. 2 depicts a block diagram of a controller for autonomous or semi-autonomous vehicle in accordance with an embodiment of this disclosure.
Figure 3:
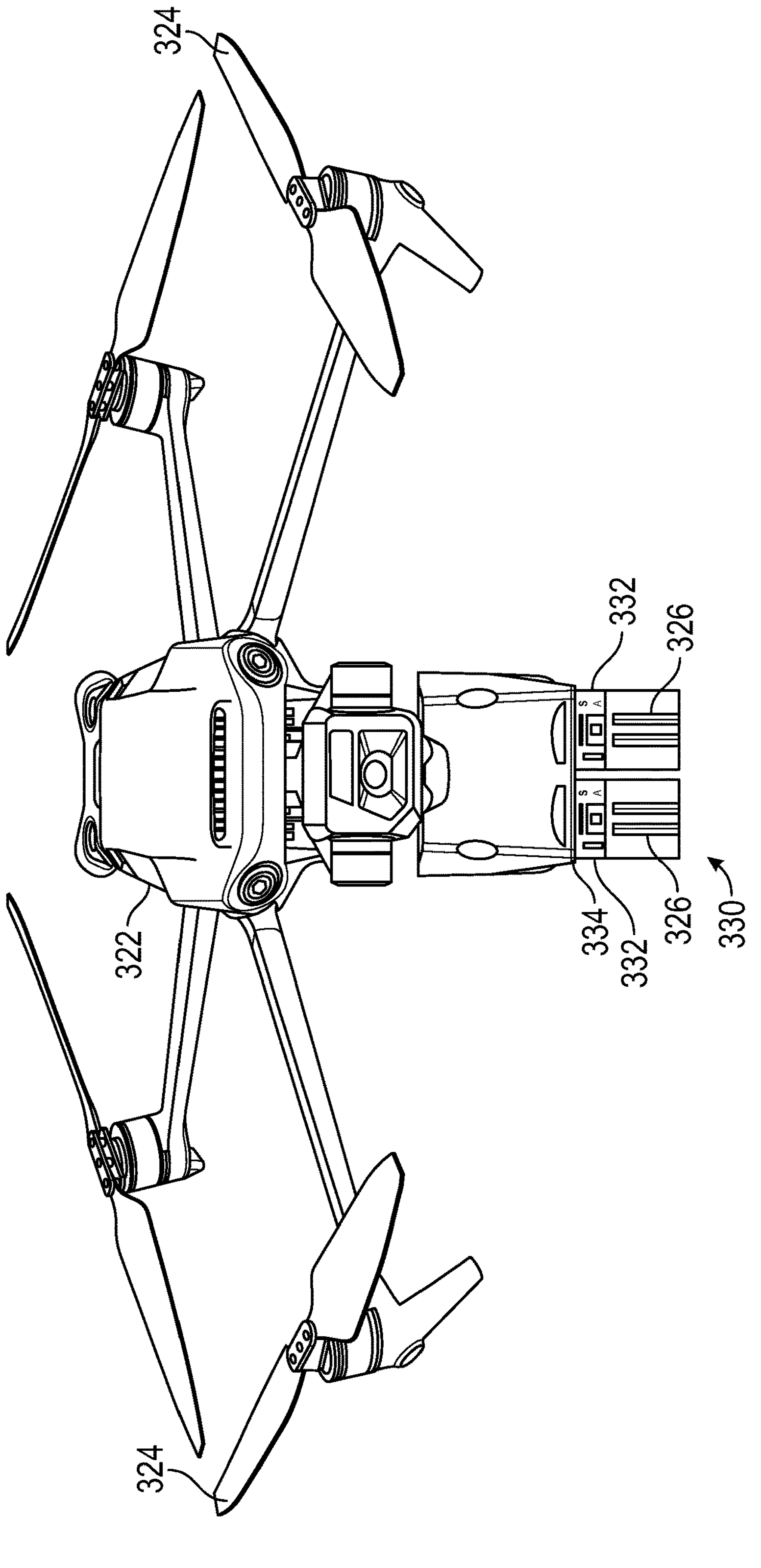
FIG. 3 is a front view of an autonomous or semi-autonomous vehicle having a weapons platform in accordance with an embodiment of this disclosure.

FIG. 2 illustrates a block diagram of a controller 38 for use in implementing a system or method according to some embodiments, such as the control module 32 for example. The systems and methods described herein may be implemented in hardware, software (e.g., firmware), or a combination thereof. In some embodiments, the methods described may be implemented, at least in part, in hardware and may be part of the microprocessor of a special or general-purpose controller 38, such as a personal computer, workstation, minicomputer, or mainframe computer.

In some embodiments, as shown in FIG. 2, the controller 38 includes a processor 105, memory 110 coupled to a memory controller 115, and one or more input devices 145 and/or output devices 140, such as peripheral or control devices, that are communicatively coupled via a local I/O controller 135. These devices 140 and 145 may include, for example, battery sensors, position sensors (altimeter 40, accelerometer 42, GPS 44), indicator/identification lights and the like. Input devices such as a conventional keyboard 150 and mouse 155 may be coupled to the I/O controller 135 when the drone is docked to allow personnel to service or input information. The I/O controller 135 may be, for example, one or more buses or other wired or wireless connections, as are known in the art. The I/O controller 135 may have additional elements, which are omitted for simplicity, such as controllers, buffers (caches), drivers, repeaters, and receivers, to enable communications.

The I/O devices 140, 145 may further include devices that communicate both inputs and outputs, for instance disk and tape storage, a network interface card (NIC) or modulator/demodulator (for accessing other files, devices, systems, or a network), a radio frequency (RF) or other transceiver/communications-circuit, a telephonic interface, a bridge, a router, and the like.

The processor 105 is a hardware device for executing hardware instructions or software, particularly those stored in memory 110. The processor 105 may be a custom made or commercially available processor, a central processing unit (CPU), an auxiliary processor among several processors associated with the controller 38, a semiconductor based microprocessor (in the form of a microchip or chip set), a macroprocessor, or other device for executing instructions. The processor 105 includes a cache 170, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 170 may be organized as a hierarchy of more cache levels (L1, L2, etc.).

The memory 110 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, or other types of storage media. Note that the memory 110 may have a distributed architecture, where various components are situated remote from one another but may be accessed by the processor 105.

The instructions in memory 110 may include one or more separate programs, each of which comprises an ordered listing of executable instructions for implementing logical functions. In the example of FIG. 2, the instructions in the memory 110 include a suitable operating system (OS) 111. The operating system 111 essentially may control the execution of other computer programs and provides scheduling, input-output control, file and data management, memory management, and communication control and related services.

Additional data, including, for example, instructions for the processor 105 or other retrievable information, may be stored in storage 120, which may be a storage device such as a hard disk drive or solid state drive. The stored instructions in memory 110 or in storage 120 may include those enabling the processor to execute one or more aspects of the systems and methods of this disclosure.

The controller 38 may further include a display controller 125 coupled to a user interface or display 130. In some embodiments, the display 130 may be an LCD screen. In other embodiments, the display 130 may include a plurality of LED status lights (e.g. visual indicator 558, FIG. 5). In some embodiments, the controller 38 may further include a network interface 160 for coupling to a network 165. The network 165 may be an IP-based network for communication between the controller 38 and an external server, client and the like via a broadband connection. In an embodiment, the network 165 may be a satellite network. The network 165 transmits and receives data between the controller 38 and external systems. In an embodiment, the external system may be another aerial drone or a drone docking system. In some embodiments, the network 165 may be a managed IP network administered by a service provider. The network 165 may be implemented in a wireless fashion, e.g., using wireless protocols and technologies, such as WiFi, WiMax, cellular, satellite, etc. The network 165 may also be a packet-switched network such as a local area network, wide area network, metropolitan area network, the Internet, or other similar type of network environment. The network 165 may be a fixed wireless network, a wireless local area network (LAN), a wireless wide area network (WAN) a personal area network (PAN), a virtual private network (VPN), intranet or other suitable network system and may include equipment for receiving and transmitting signals.

Referring now to FIG. 3 and FIGS. 4A-4C, an embodiment is shown of a drone 320 that includes a weapons system 330. In an embodiment, the drone 320 may be a Pegasus unmanned aerial vehicle manufactured by Robotic Research LLC of Clarksburg, Maryland, USA. The drone 320 is substantially similar to the drone 20 of FIG. 1. In an embodiment, the drone 320 is configured to switch between aerial vehicle and ground vehicle operations. The drone 320 includes a fuselage 322 and a plurality of thrust devices 324.

Figure 4A:
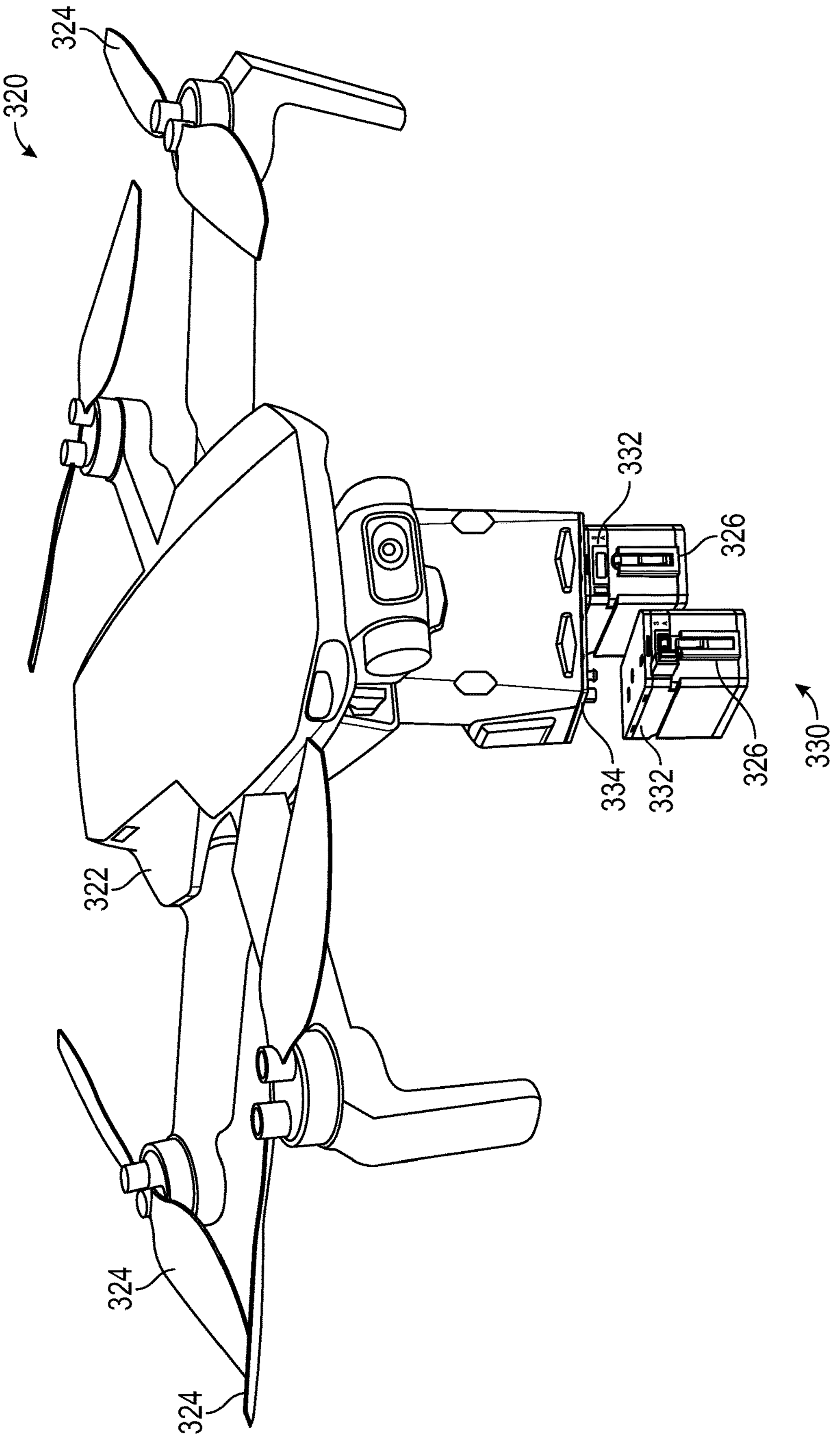
FIG. 4A is a perspective view of an autonomous or semi-autonomous vehicle with a payload being released from the platform in accordance with an embodiment of this disclosure.
Figure 4B:
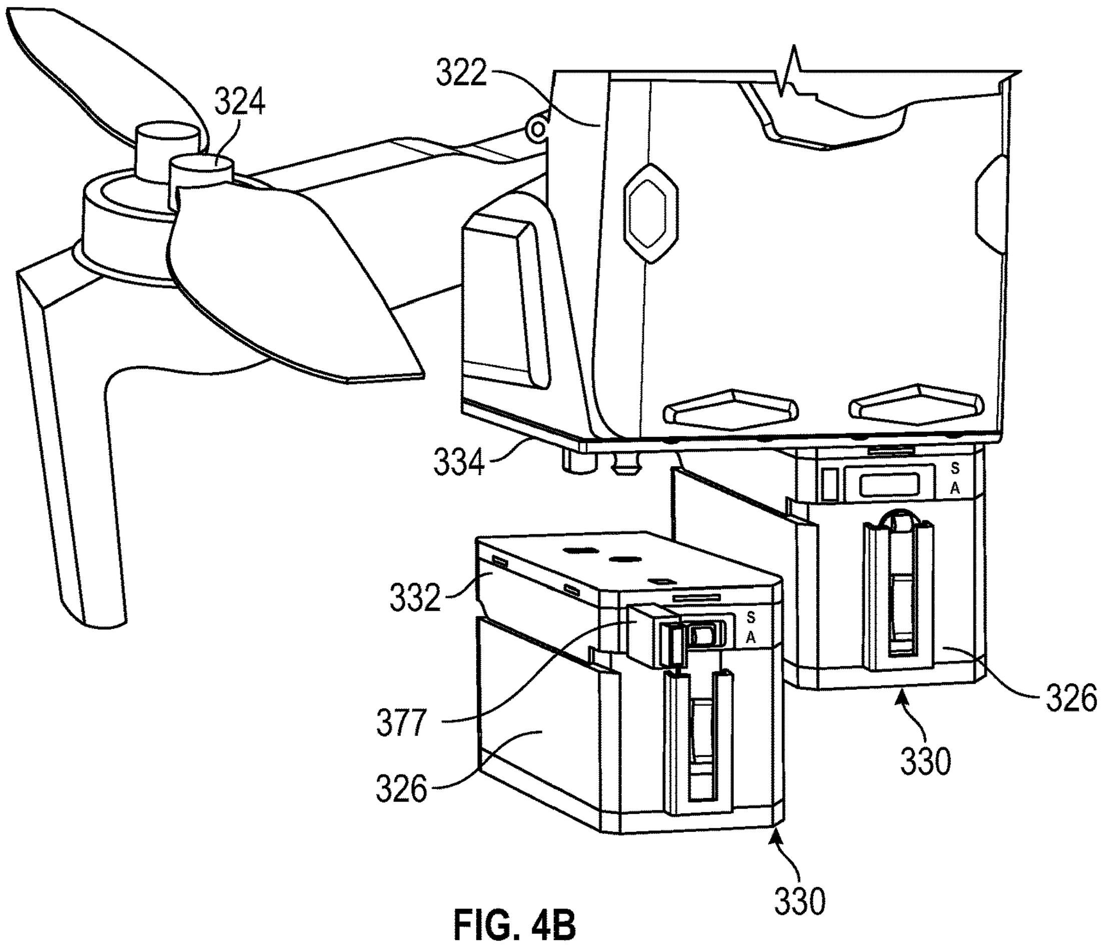
FIG. 4B is a partial perspective view of the vehicle of FIG. 4A with a FOB key inserted in the control module.
Figure 4C:
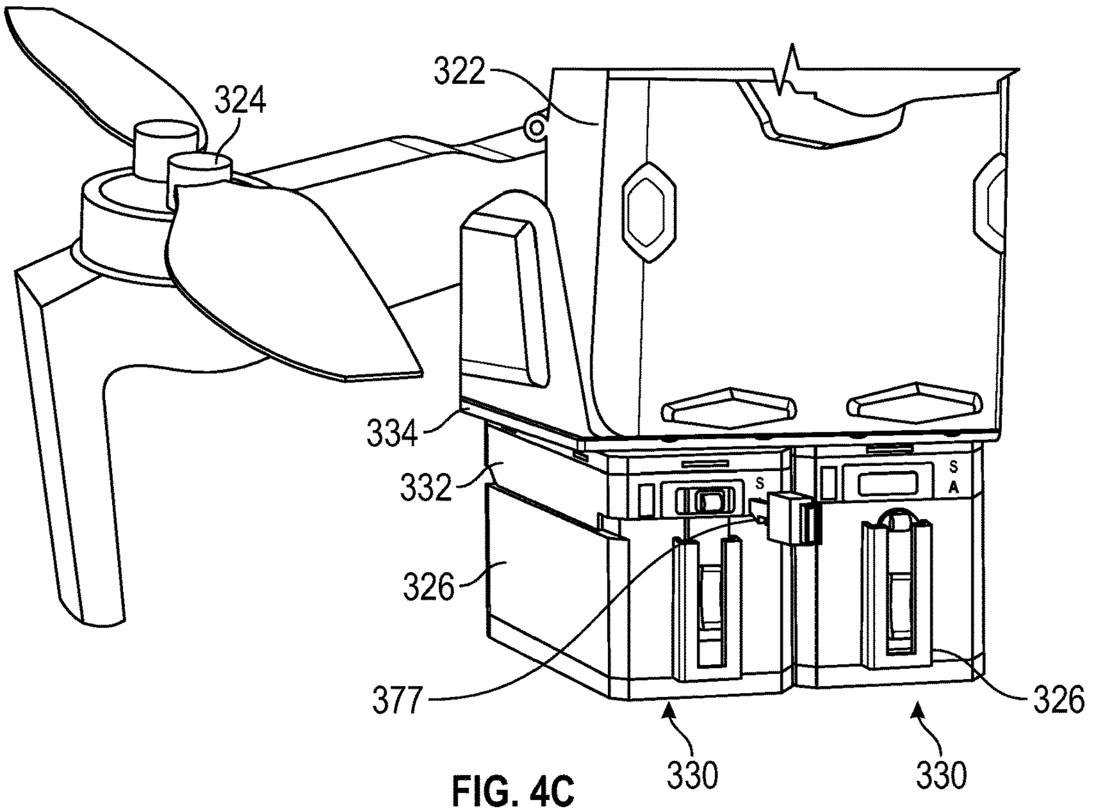
FIG. 4C is a partial perspective view of the vehicle of FIG. 4B with the FOB key being removed from the control module.

In an embodiment, the weapons system 330 includes an attachment plate 334. In an embodiment that system 330 includes a single attachment plate 334 that multiple control modules 332 and multiple energetic modules 326 are attached. As used herein, the term "payload module" refers to an assembly consisting of a control module and an energetic module. In another embodiment multiple attachment plates 334 are provided and each attachment plate 334 has an associated control module 332 and payload 326. In the example embodiment, while the weapons system 330 is coupled to the drone 320, the weapons system 330 is functionally independent from the drone 320. In other words, there is no power, communications, or data transfer between the drone 320 and the control module 332 or energetic module 326. It should be appreciated that this independence allows the weapons system 330 to be coupled or redeployed to different drones without needing to reconfigure or alter the weapons system 330. As will be discussed in more detail herein, when the payload module is coupled to the attachment plate 334, a key FOB 377 is disengaged from the control module and may be removed by the operator (FIG. 4C). In an embodiment, when the key FOB 377 is coupled to the control module, the energetic module 326 cannot be activated.

Figure 5A:
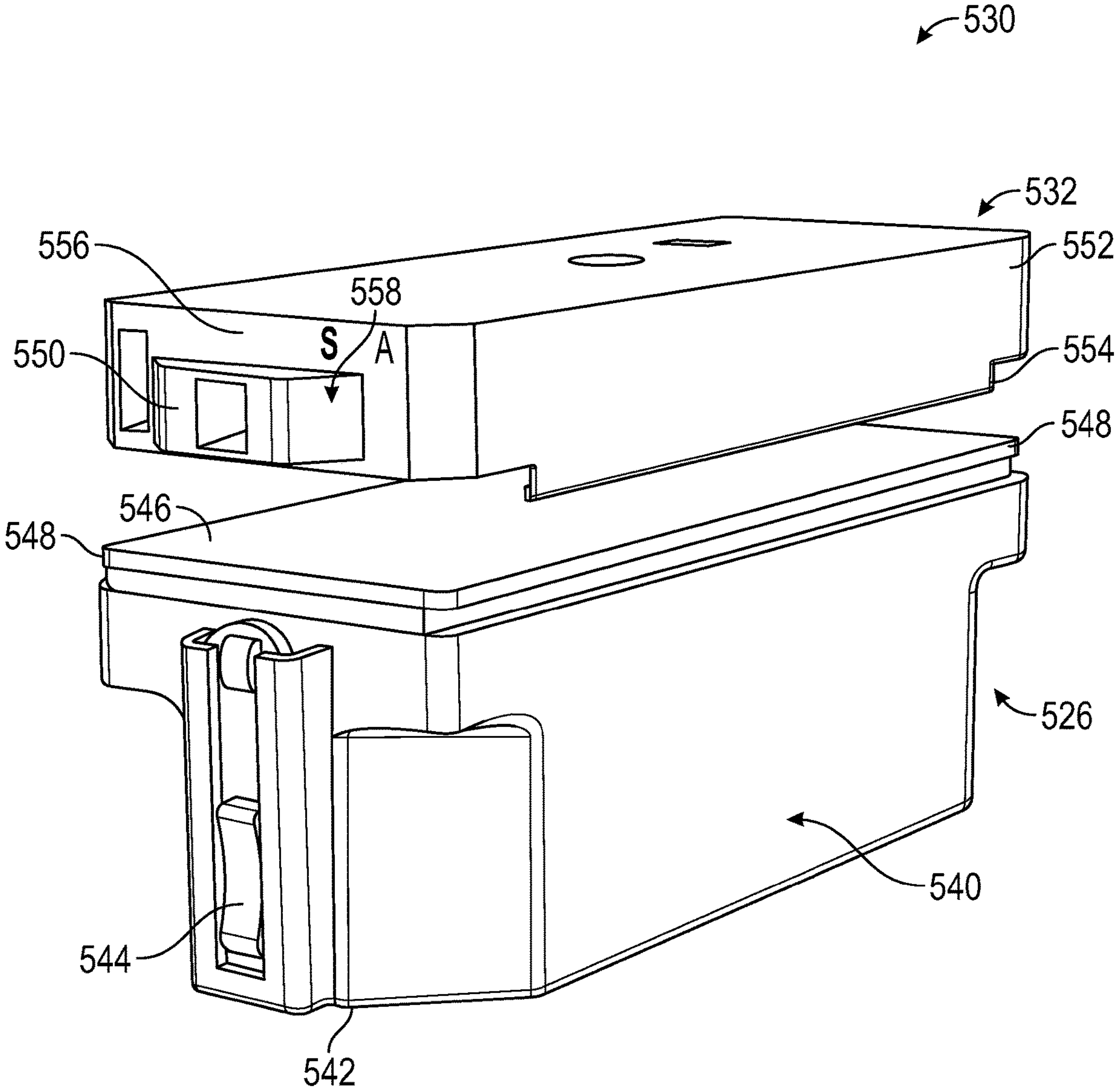
FIG. 5A is a partially unassembled perspective view of the weapons platform of FIG. 3 in accordance with an embodiment of this disclosure.
Figure 5B:
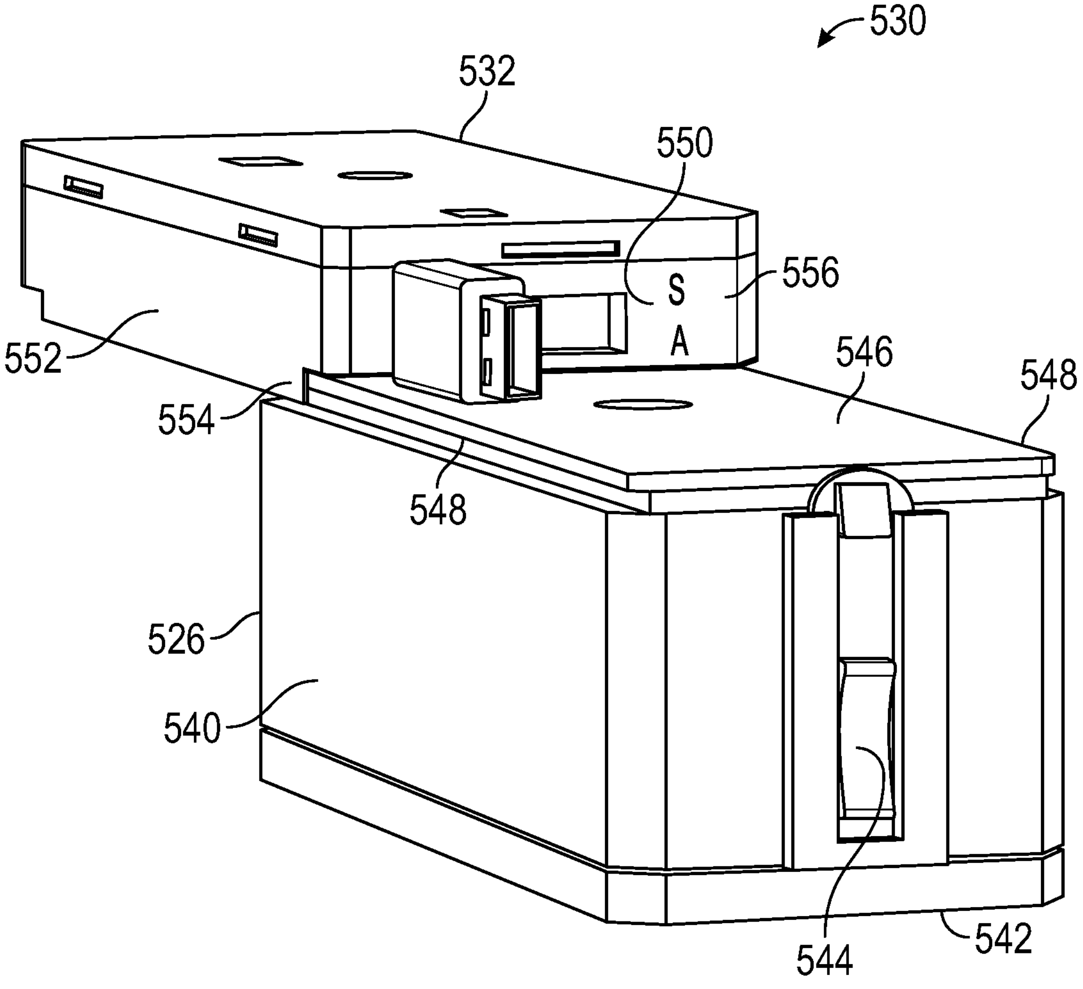
FIG. 5B is a perspective view of the weapons platform of FIG. 5A with the control module in the process of being assembled to the energetic module.
Figure 6:
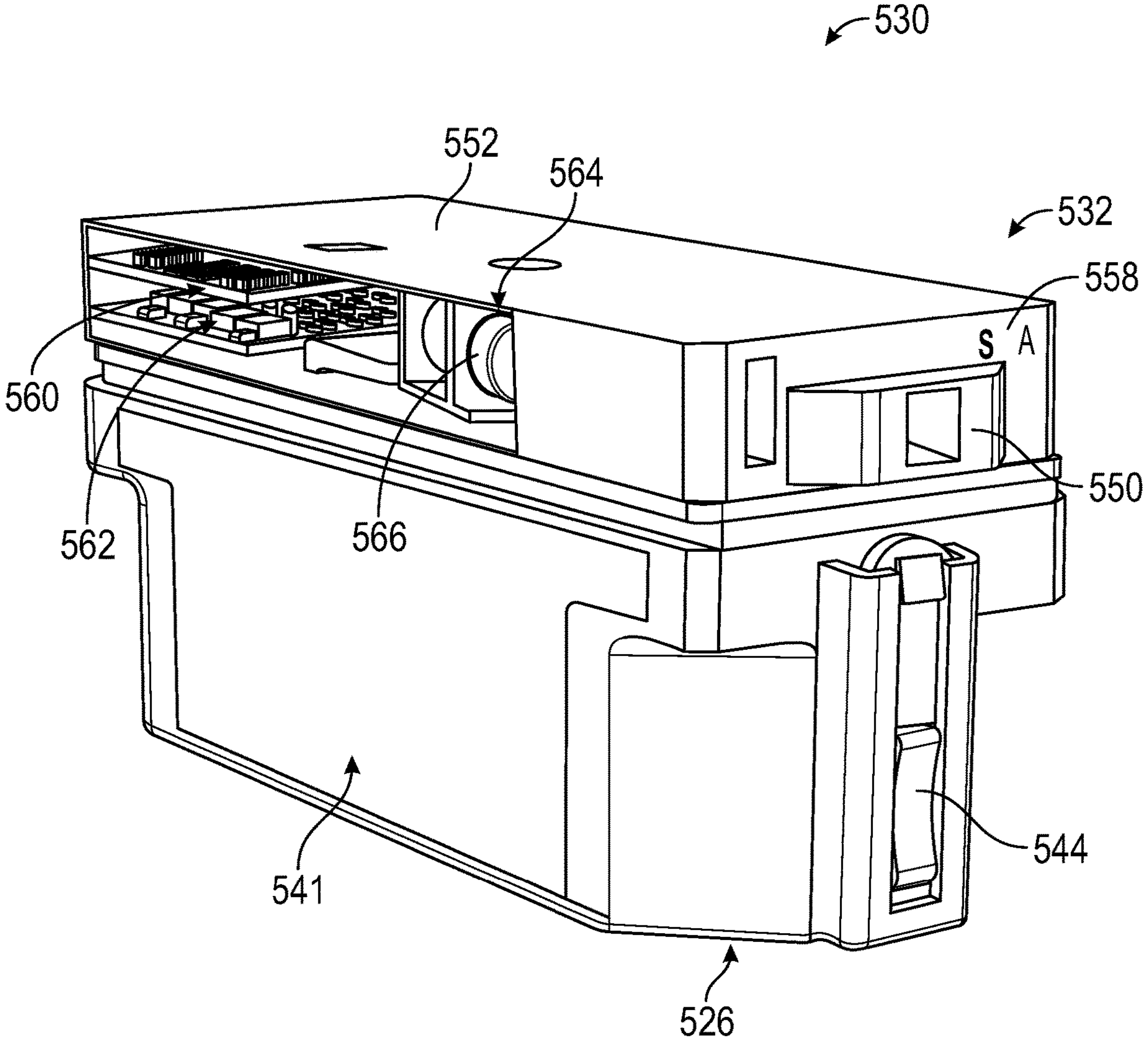
FIG. 6 is a perspective view, partially in section, of the weapons platform of FIG. 5 in accordance with an embodiment of this disclosure.

Referring now to FIG. 5A, FIG. 5B, and FIG. 6 an embodiment is shown of the payload module 530. In this embodiment, the payload module 530 includes a energetic module 526 and a control module 532. The energetic module 526 includes a housing 540. In an embodiment, the housing 540 has a generally cuboid shape and contains an energetic 541, such as but not limited to polymer-bonded explosive (PBX) or thermite for example. Arranged on at least one end 542 is a latch 544 that interconnects and fixes the housing 540 to the control module 532. The latch 544 includes a slidable lever that engages a locking element 550 in the control module 532. It should be appreciated that in other embodiments, other types of locking elements 550 may be used. In an embodiment, the housing 540 includes a cover 546 having a coupling element 548. In an embodiment, the coupling element 548 slidably couple the housing 526 to the control module 532 (FIG. 5B). In an embodiment, the coupling element 548 has a dovetail shape. In an embodiment, the energetic module 526 is removably coupled to the control module 532, which allows for different energetics to be coupled to the payload module 530. To replace the energetic module 526, the operator disengages the interlock 544 from the locking element 550 and then slides the housing 540 relative to the control module 532 to remove the energetic module 526.

The control module 532 includes a housing 552 that includes a coupling element 554 that cooperates with the coupling element 548. Disposed on the end 556, adjacent to the locking element 550 is a visual indicator 558. The visual indicator 558 is configured to display a different color or symbol based on the operational setting (e.g. safe or armed).

Disposed within the housing 552 is an electronic safe and arm circuit 560, a communications circuit 562, and a mechanical release assembly 564. In an embodiment, the mechanical release assembly 564 includes a solenoid or servo 566 that engages a pin on the attachment plate 334 (FIG. 4). When energy is applied to the solenoid 566, the solenoid retracts and releases its connection on the control module 532 and energetic module 526.

It should be appreciated that since the payload module 530 includes energetics 541, a safety architecture is incorporated into the assembly to reduce the risk of inadvertent activation of the energetic 541. In an embodiment, the operation of the payload module 530 is guided by Mil Spec MI-STD-1911, which provides for two independent inhibiting mechanisms to prevent unintentional arming of the energetic. As such the arming inhibits are removed by independent and sequential actions.

Figure 7:
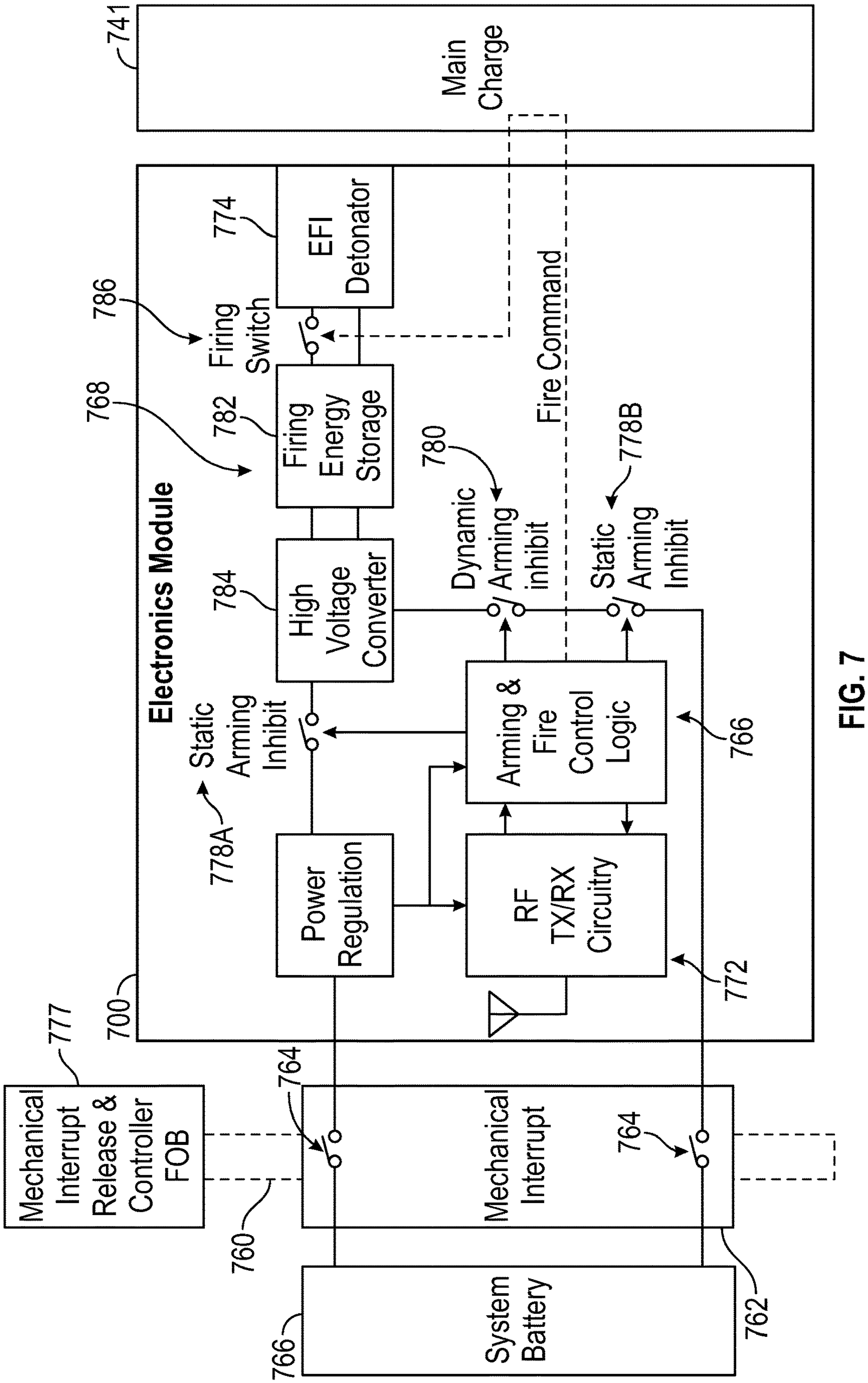
FIG. 7 is a block diagram of the arming system for the weapons platform of FIG. 5 in accordance with an embodiment of this disclosure.

To accomplish this standard, two elements are used to interlock the arming of the energetic. First a feature on the attachment plate 334 removes a pin 760 from the an energetic safety interlock 762 (FIG. 7) when the payload module 530 is attached to the attachment plate. In an embodiment, the arrangement is configured such that a safety pin 760 can only be removed and replaced when the payload module 530 is attached to the attachment plate 334. Removal of the safety pin 760 closes switches 764 to electrically couple the internal circuitry 700 to battery 766. In other embodiments, the feature on the attachment plate 334 engages a switch that disengages an interlock that holds/prevents-removal of the pin 760.

The payload module 530 is secured to the drone 20 by the solenoid 566. When energy is applied to the solenoid 566, a solenoid plunger moves from an extended position to a retracted position to release the control module and payload assembly from the attachment plate. When the solenoid is not energized, the plunger retains the payload 526 to the drone 20. In an embodiment, the solenoid 566 is momentarily energized when the energetic payload is attached. Power is removed when the safety pin 760 is removed or disengaged. When an operator sends the command to release the energetic, such as via communications circuit 562 for example, the solenoid 566 is once again temporarily energized causing the solenoid 566 to retract and allow the control module and payload 526 to decouple from the attachment plate and move away from the drone 20 under the influence of gravity. In an embodiment, once the payload module 530 separates from the attachment plate, the solenoid 566 is deenergized to avoid draining the energy-source/conserve-energy.

In an embodiment, the arming circuitry 700 includes a first portion that provides safety logic 768 and a second portion 770 that generates and transfers a high-voltage fire pulse to initiate a low energy exploding foil initiator (LEEFI) 774 to activate the energetic 741. It should be appreciated that while embodiments herein may refer to the use of a LEEFI to activate the energetic, this is for example purposes and the claims should not be so limited. In other embodiments, other components may be used, such as but not limited to an exploding bridge wire (EBW) detonator or a hot bridge wire (HBW) detonator for example. Two-way radio frequency circuits 772 are provided to allow the operator to initiate operation. In an embodiment, the power is provided by a replaceable and rechargeable battery 766.

Figure 8:
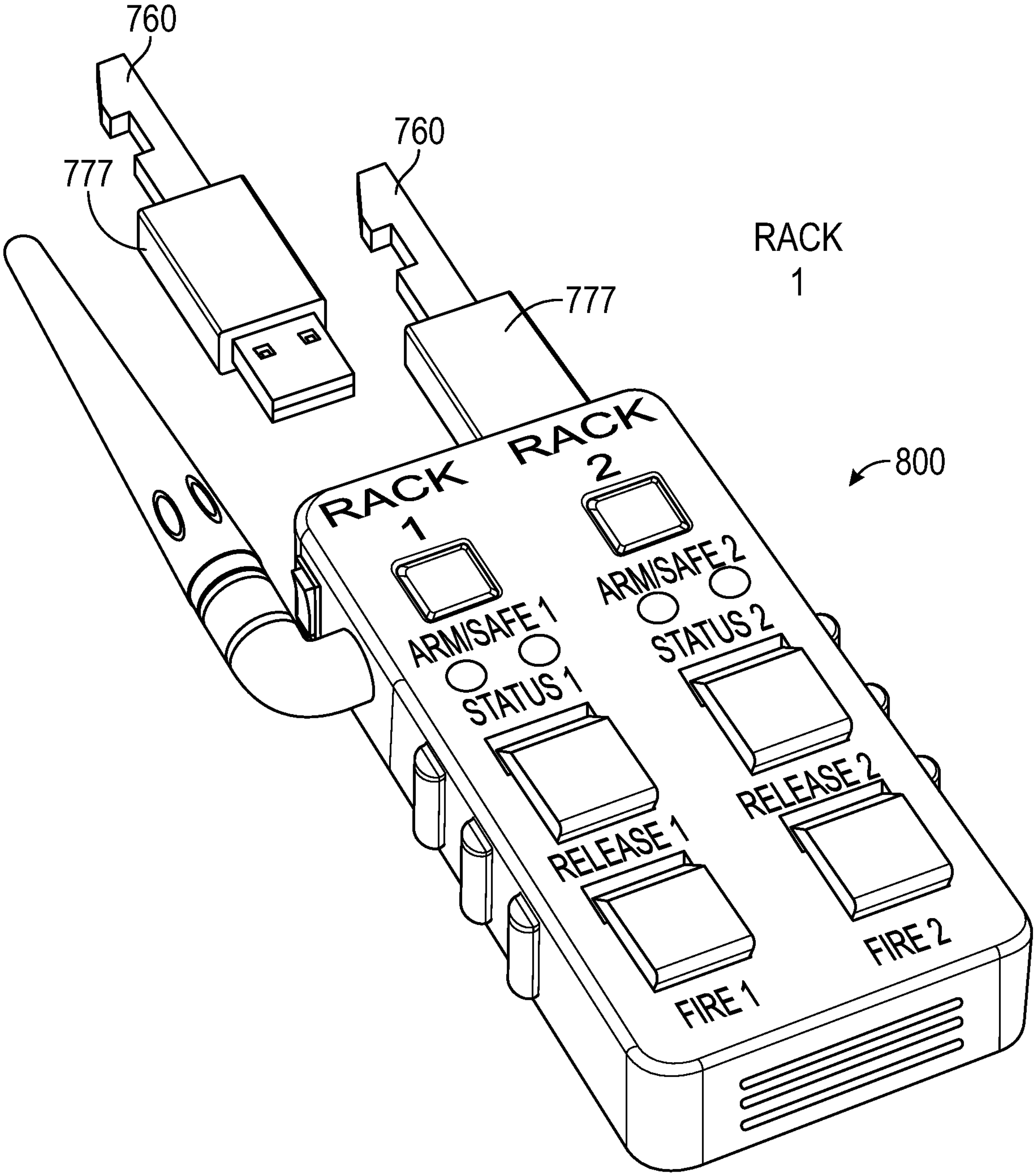
FIG. 8 is a perspective view of hand held controller for use with the weapons platform in accordance with an embodiment.

The circuit 700 is energized when the pin 760 is removed and communication is established when the key FOB 777 is inserted into an operator controller 800 (FIG. 8). In an embodiment, the key FOB 777 includes a connector, such as a USB connector that couples with the operator controller 800. The key FOB 777 when coupled with the operator controller 800 allows the operator controller 800 to transmit coded signals to the control module which the key FOB 777 is associated. In an embodiment, when communications are established, the circuit 700 performs a power-on test to verify system readiness to perform a mission.

It should be appreciated that in the embodiment of FIG. 8, the controller 800 includes two sets of controls that allow the controller to remove inhibits (e.g. arm), release the system 330, and fire/activate the payload 326. Two sets of controls are provided to allow the control of the two systems 330 to be operated independently.

In an embodiment, two signals from the operator are used to control and arm the energetic module 526. A first coded (e.g. encrypted) signal is sent by the operator when the drone 20 has reached a safe separation distance. This action closes one of the static arming inhibit switches 778A. The second coded signal is the command to release the payload module 530 and closes the other static arming inhibit switch 778B. A timer within control logic gives the drone 20 the opportunity to move from the area before automatically closing the dynamic arming inhibit 780 (in response to the expiration of the timer), which then charges the high voltage firing capacitor 782 which receives electrical power from a high voltage converter 784. At this time the energetic 741 is fully armed. In an embodiment, once the second coded signal is received, the solenoid is deenergized to conserve energy. A third (final) signal from the operator is used to operate the firing switch 786, which leads to detonation of the energetic 741 by the LEEFI 774. The circuit 700 will sterilize the payload 526 if the energetic 741 is not commanded to detonate within a predetermined amount of time, or when power level in the battery 766 drops below a predetermined level.

In an embodiment, until the point where the second signal is transmitted and received, the energetic may be returned to a safe condition and the drone 20 moved back to the operator. In an embodiment, the operator returns the energetic to a safe condition by cancelling the first signal (safe separation distance), which opens one of the static arming inhibit switches 778. When the drone 20 lands adjacent the operator, the operator removes the key FOB 777 from the controller and replaces the safety pin 760 to disconnect the battery 766 from the circuit 700.

It should be appreciated that material used in the energetic 741 may include fragmentary rounds, high explosives, thermite, shaped charges, or non-lethal effects such as sound, pyrotechnics, smoke, or other disorientation or distraction effects.

In an embodiment, the operation of the payload 526 is controlled by a handheld remote device. The handheld device is configured to encode the payload 526 over an encrypted channel In an embodiment, the handheld device is separate from the drone 20 controller. It should be appreciated that this provides advantages in allowing the operator the flexibility to move the system 30 between drones 20.

Figure 9A:
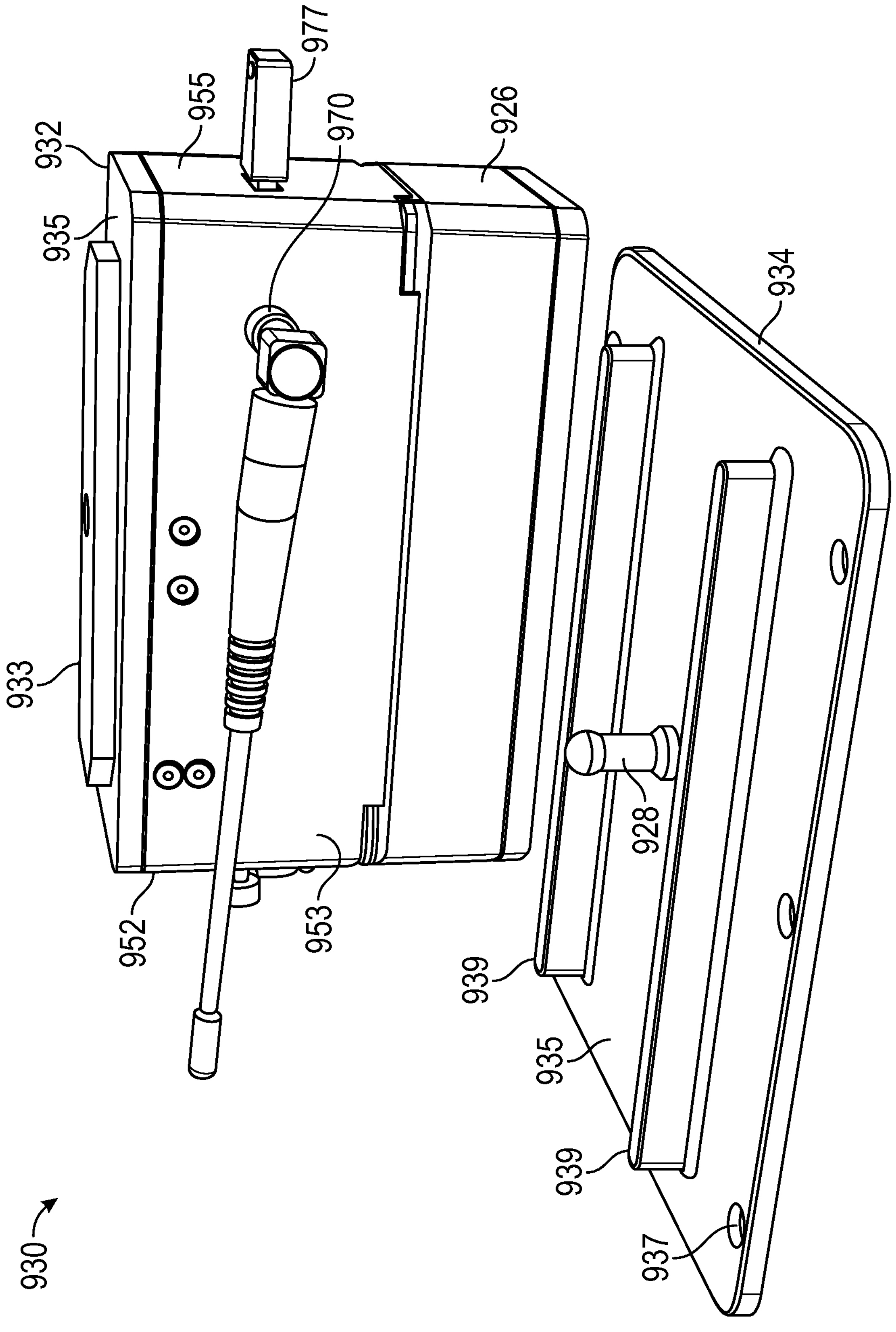
FIG. 9A is a front perspective view of a weapons platform in accordance with another embodiment.
Figure 9B:
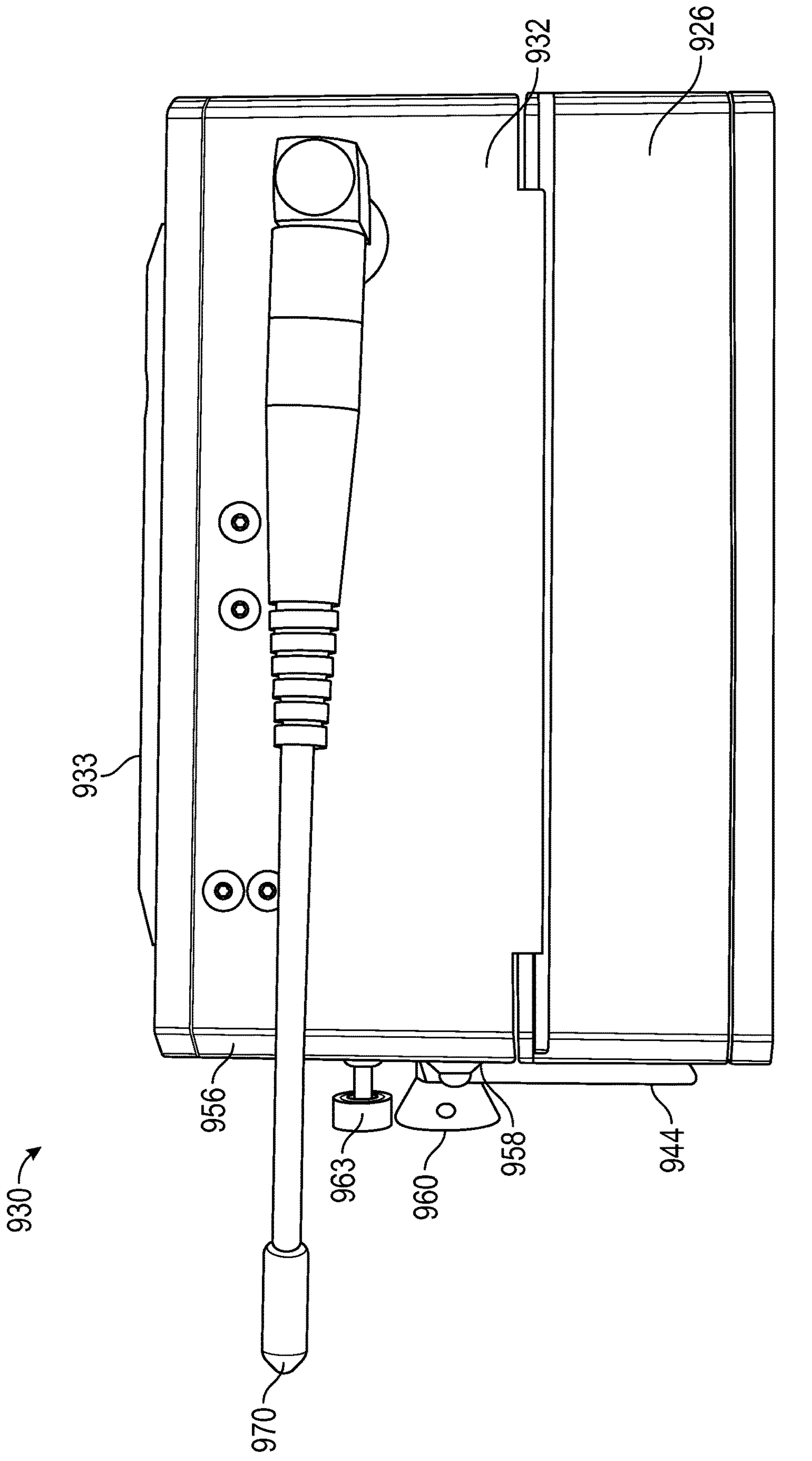
FIG. 9B is a side view of the weapons platform of FIG. 9A.
Figure 9C:
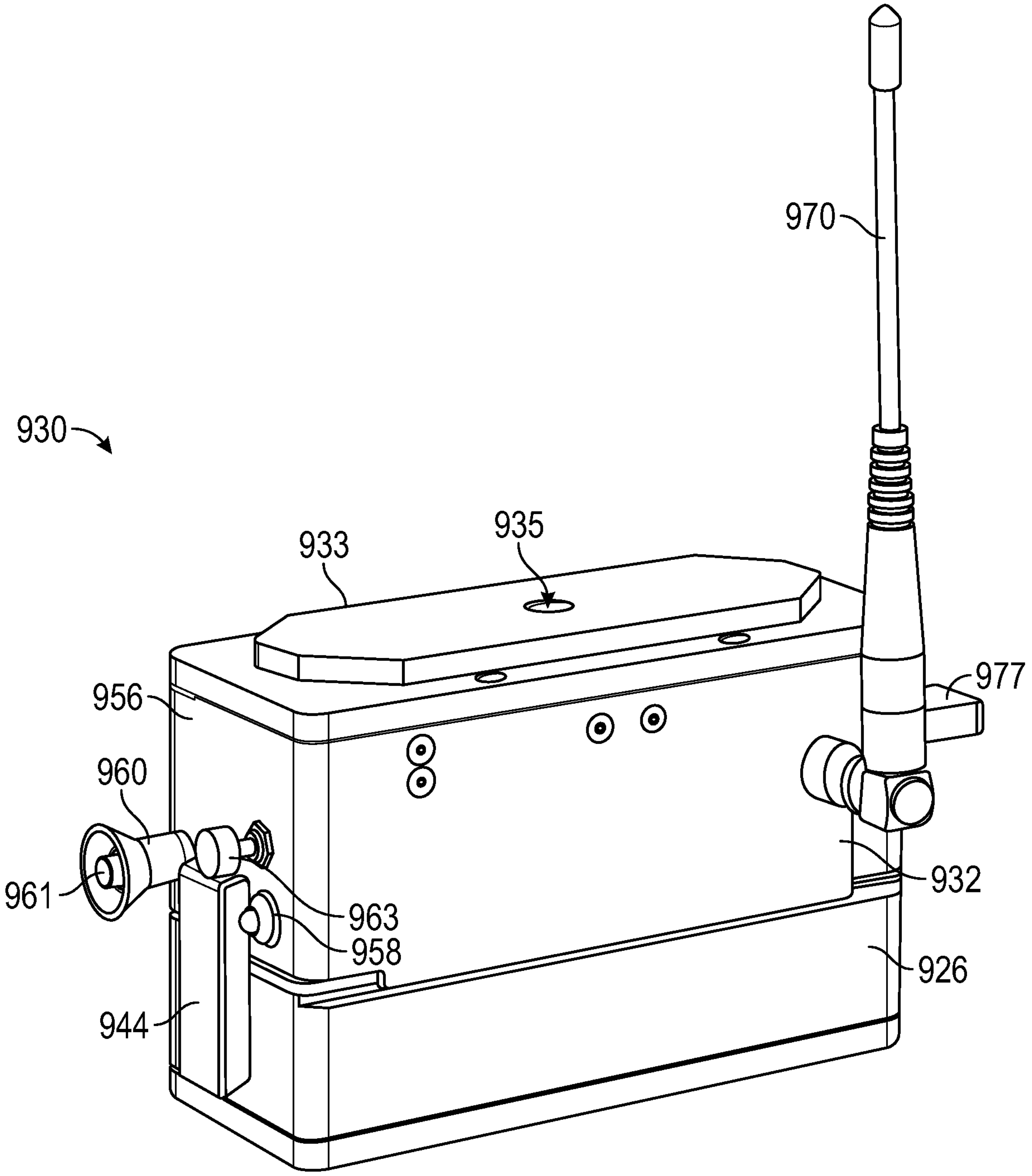
FIG. 9C is rear perspective view of the weapons platform of FIG. 9A.

Referring now to FIGS. 9A-9C, another embodiment of the system 930. The system 930 includes a control module 932, a payload 926, and a mounting plate 934. The control module 932 includes a pad 933 that is disposed on a top surface 935. The pad 933 may be made from an open or closed cell foam material for example. The pad 933 is disposed between the top surface 935 and the bottom surface of the plate 934 to reduce the transfer of vibrations from the drone and the control module 932. The pad 933 includes an opening 935 that is sized to receive the pin 928 on plate 934.

In this embodiment, the control module 932 includes an antenna 970. In an embodiment, the antenna 970 is rotationally coupled to the side 953 of the housing 952. Being able to rotate the antenna 970 provides advantages in allowing the antenna to be repositioned depending on the fuselage geometry of the drone and the payload. On a first end 955, a key FOB 977 is coupled via a universal serial bus (USB) port. Similar to the FOB 377, the FOB 977 allows the control module 932 to pair for communications with a handheld controller used by the operator.

On an opposite end 956, a separate mechanical interlock pin 960 extends outward from the housing 952. In an embodiment, the interlock pin 960 is retained to the housing 952 by a detent mechanism 961. As discussed in more detail herein, in an embodiment the removal of the interlock pin activates a timer the initiates selected operating components of the control circuitry (e.g. internal circuitry 700). Also disposed on the end 956 is an actuator 963. The actuator 963 is electrically coupled to operate an internal servo or solenoid (e.g. servo 566). In an embodiment, the activation of the actuator 963 causes a movement of a cam that allows the pin 928 to be received by the control module 932. When the pin 928 is inserted, and the actuator 963 is released, the cam engages the pin 928 to mechanically couple the control module 932 to the plate 934. Arranged adjacent the actuator 963 and the interlock pin 960 is a visual indicator 958, such as an light emitting diode (LED) for example. In an embodiment, the indicator 958 will emit light of a predetermined color to indicate to the operator the state of the control module 932. For example, the emitting of a green light may indicate that the pin 960 is removed and the operator should move to a predetermined distance away before a timer expires. The emitting of a yellow light may indicate that the mechanical interlock has been removed and portions of the control circuit are active.

In an embodiment, the end 956 further includes a feature that cooperates with a latch member 944 of the payload 926. When the latch 944 engages the feature, the payload 926 is mechanically coupled to the control module 932 (e.g. the payload will not slide relative to the control module).

In this embodiment, the plate 934 includes a planar portion 935 having a plurality of holes 937 that are arranged and sized to allow the plate 934 to mount to a variety of different drone/vehicles. Extending from the planar portion 934 are a pair of ribs 939. The ribs 939 are arranged on either side of the pin 928. The ribs 939 prevent side to side movement of the control module 932.

Figure 10:
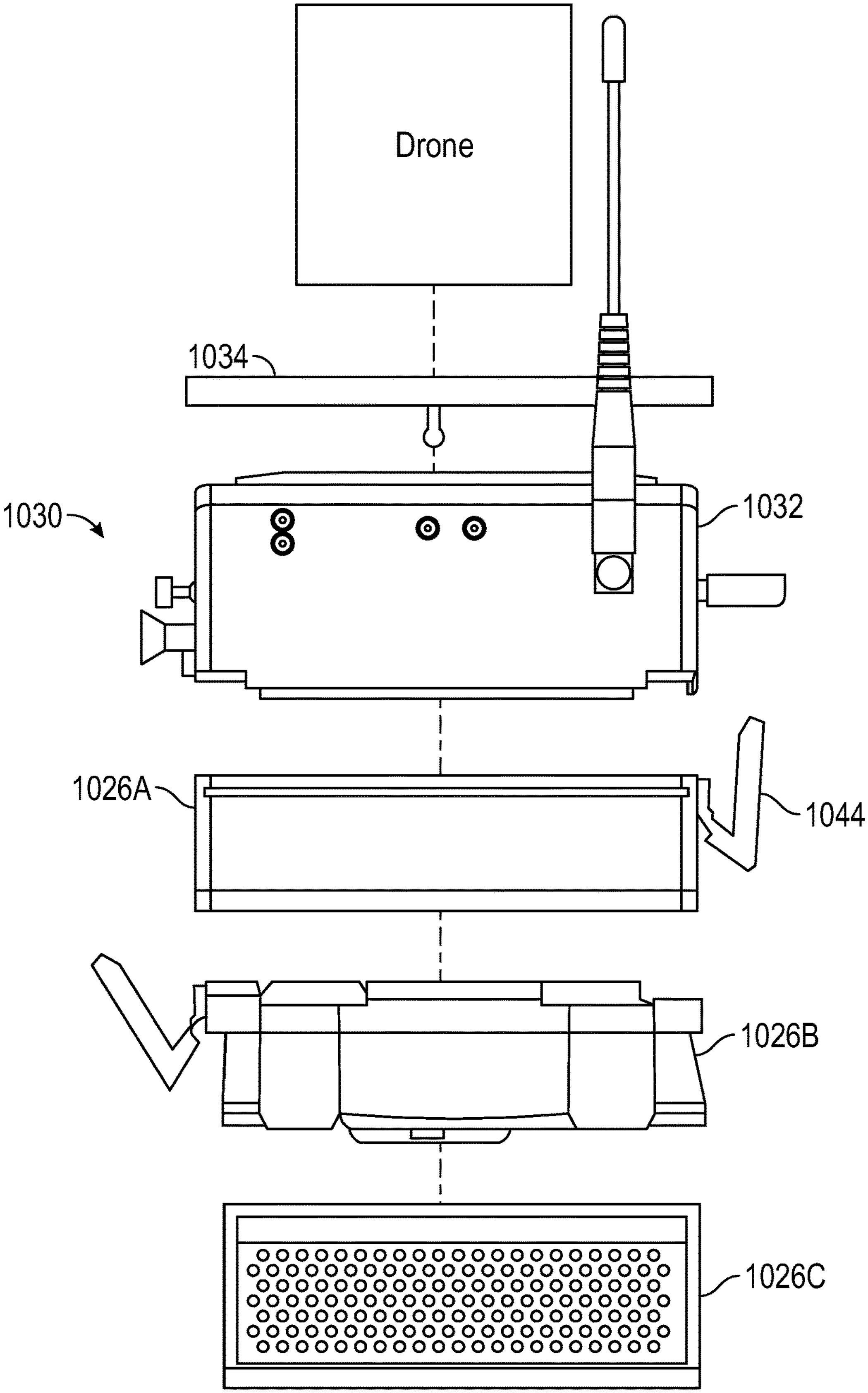
FIG. 10 is a side view of a weapons platform in accordance with yet another embodiment.

Referring now to FIG. 10, an embodiment is shown of a system 1030 having a mounting plate 1034 that is coupled to a vehicle, such as a drone 120. The system 1030 further includes a control module 1032 and a plurality of payloads 1026A, 1026B, 1026C. In an embodiment, the control module 1032 is the same as that described herein with respect to control modules 332, 532, 932. It should be appreciated that in some situations, more than one type of payload may be desired to accomplish the desired goal. For example, where an energetic payload is being delivered, more than one type of energetic may be used to neutralize a target. Where the payload is delivering an article such as medicine or medical supplies, more than one type of medical supply may be desired. In this embodiment, the top most payload 1026A is removably coupled to the control module 1032 in a similar manner as described herein and is fixed in place by a clip or fastener 1044. The subsequent payloads 1026B, 1026C are then coupled in series to the first payload 1026A in a similar manner (e.g. slidably engages the previous payload and is secured with a clip).

In another embodiment, the control module 1032 may be configured to selectively uncouple the payloads 1026A, 1026B, 1026C to place the payloads at multiple target locations. In this embodiment, each of the payloads 1026A, 1026B, 1026C may include control passthrough that allows signals from the control module 1032 to be transmitted to the desired payload.

Figure 11A:
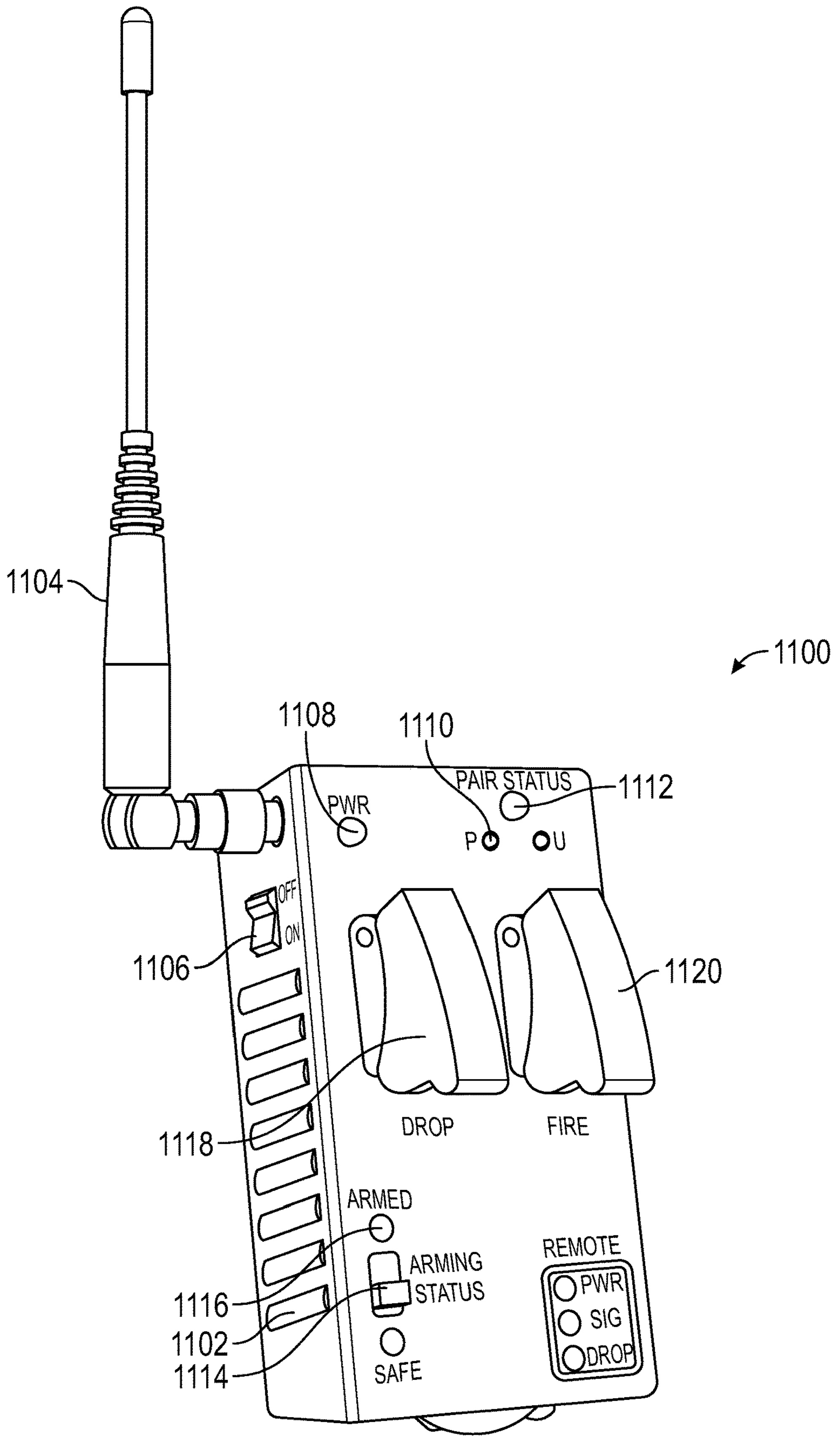
FIG. 11A and FIG. 11B are perspective and front views of a hand held controller for use with a weapons platform of FIG. 1, FIG. 3, FIG. 9A and FIG. 10 in accordance with an embodiment.
Figure 11B:
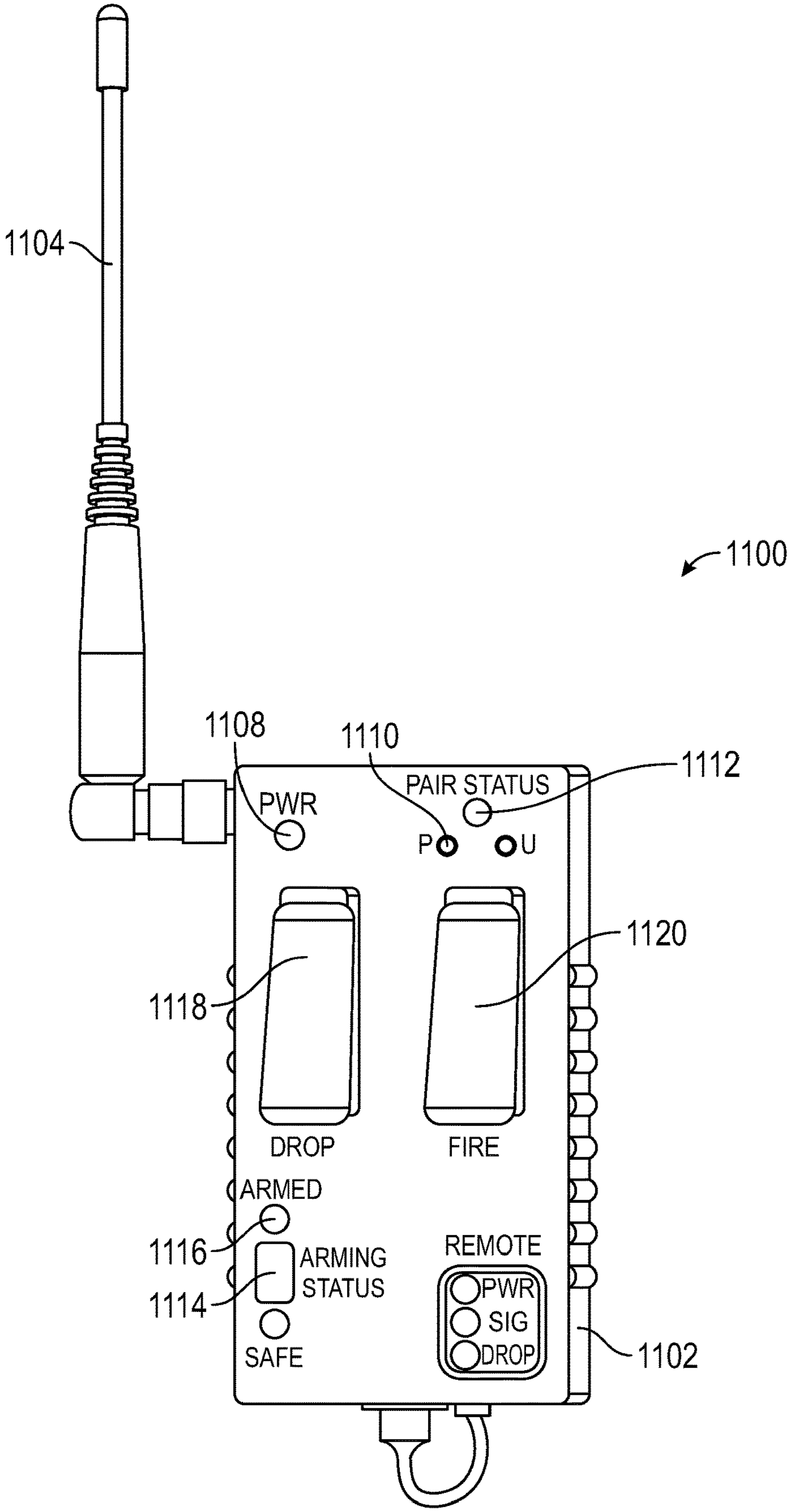

Referring now to FIG. 11A, 11B, another operator controller 1100 is shown for use with any of the systems 830, 530, 930, 1030 described herein. In this embodiment, the controller 1100. The controller 1100 includes a housing 1102 that includes a port (not shown) configured to receive a FOB, such as FOB 777, 977 for example, that allows one or more processors or circuits within the controller 1100 to communicate with the system 830, 530, 930, 1030. The controller 1100 further includes an antenna 1104 that is configured transmit signals to, and receive signals from the system 830, 530, 930, 1030. The controller 1100 includes an actuator 1106, such as a slide switch for example, that turns-on or activates the controller 1100. In an embodiment, an indicator, such as LED 1108, emits light when the controller 1100 is activated.

Typically the first step in setting up the controller 1100 is to pair the controller with the system 830, 530, 930, 1030. This is done by installing the USB FOB 777, 977 in the port and then depressing an actuator, such as button 1110 for example, for a predetermined amount of time (e.g. 5 seconds) until an indicator, such as LED 1112 starts flashing. In an embodiment, the operator then releases and immediately depresses the button 1110 again. At this point, if successful, the controller 1100 is paired with the USB. In an embodiment, the power LED 1108 emits green light when the pairing is completed. In an embodiment, any other LED's on the controller 1100 will flash until the controller is paired with the control module 332, 532, 932, 1032.

In an embodiment, the FOB 777, 977 is removed from the controller 1100 and then installed on the control module 332, 532, 932, 1032. It should be appreciated that at the point when the FOB 777, 977 is installed, there is only power to the servo motor or solenoid (e.g. no electrical power to the firing circuit). The servo motor or solenoid only draws power when the actuator on the control module, such as actuator 963 for example, is actuated. The actuating of the actuator 963 allows the control module 332, 532, 932, 1032 to be installed-on/coupled-to the vehicle/drone. In an embodiment, the FOB 777, 977 remains coupled to the control module 332, 532, 932, 1032 for the duration of the mission. Where the payload includes an energetic, the FOB 777, 977 is either destroyed or damaged to render it inoperable upon activation of the energetic.

With the system 830, 530, 930, 1030 installed on the drone, the operator removes the pin 760, 960. In an embodiment, this activates a first predetermined timer (e.g. 30 seconds), that allows the operator to move away from the drone by a predetermined distance. When the time expires, the indicator 958 emits light, such as yellow light for example, to provide a visual indication that power is available to the next level of safety inhibit (e.g. static arming inhibit 778A, 778B). In an embodiment, the removal of the pin 760, 960 further initiates a second predetermined timer (e.g. 60 minutes). If the second timer expires, all voltage to the high voltage converter 784 is removed/turned-off. In an embodiment, when the second timer expired, power to the servo motor or solenoid remains so that the system 830, 530, 930, 1030 may be removed from the drone.

In an embodiment, if the pin 760, 960 is reinserted into the control module 332, 532, 932, 1032, electrical power is removed from the static arming inhibit. 778A, 778B and the first and second timers are reset.

With the pin 760, 960 removed, the control module 332, 532, 932, 1032 established communication with the controller 1100 based at least in part on data stored on the FOB key 777, 977. In an embodiment, when communication is established between the controller 1100 and the control module 332, 532, 932, 1032, the indicators/LED's on the controller will stop blinking/flashing.

During operation, the operator will typically move the drone a predetermined distance away and then move the arming actuator 1114 from a first or "safe" position to a second or "armed" position. In an embodiment, the indicator/LED 1116 emits a light, such as a red light for example. In an embodiment, this closes the static arming inhibit 778A, 778B.

The drone is then moved to the desired location (e.g. the target location). At the desired time, the operator opens the drop cover 1118 to expose an actuator, such as a first toggle switch for example. Upon actuation of the first toggle switch, a first signal is transmitted from the controller 1110 to the control module 332, 532, 932, 1032. When the first signal is received. the servo motor or solenoid is activated allowing the control module 332, 532, 932, 1032 and any payloads 326, 526, 926, 1026A to move away from the plate 334, 534, 934, 1034 under the influence of gravity. In an embodiment, the receiving of the first signal initiates a third predetermined timer (e.g. 5 second timer), which prevents the arming of the high voltage converter 784 to provide sufficient time for the system to fall out of the way and for the drone to move away from the payloads.

Finally, the operator lifts a fire cover 1120 to expose an actuator, such as a second toggle switch for example. Upon actuation of the second toggle switch, a second signal is transmitted from the controller 1110 to the control module 332, 532, 932, 1032. The receiving of the second signal causes the control module 332, 532, 932, 1032 to close the dynamic arming inhibit 780 causing electrical power to flow from the system battery 766 to the high voltage converter 784 and charge the firing energy storage 782. The energy from storage 782 is rapidly flowed to the detonator 774.

It should be appreciated that in an embodiment where the payload is an article, such as medical supplies for example, the operator will not need to activate the second toggle switch.

In the event that there is a mis-fire, or if the mission of the drone is abandoned, the drone can be moved to a desired location, such as away from personnel and allowed to rest for a minimum of the length of time of the second timer (e.g. 60 minutes) so that energy is removed from the control module 332, 532, 932, 1032 except for the power to the servo motor or solenoid. The operator may turn of power to the controller 1100 (e.g. actuator 1106) and optionally remove the battery from the controller 1100. The operator then approaches the drone and reinserts the pin 760, 960 and removes the FOB 777, 977. By pressing the actuator 963, the system 330, 530, 930, 1030 may be removed from the drone and the payload 326, 526, 926, 1026A separated from the control module 332, 532, 932, 1032. In an embodiment, the energy source (e.g. battery) is removed from the control module 332, 532, 932, 1032.

It should be appreciated that while embodiments herein describe the system 20 as having a pair of energetic payloads arranged in parallel, this is for example purposes and the claims should not be so limited. In other embodiments, the system 30 may have a single energetic payload, or a plurality of energetic payloads to meet the goal of the mission the drone is undertaking.

Technical effects and benefits of some embodiments include the ability to allow a drone to deliver a payload where the payload is independently operable from the drone. Still further embodiments provide technical effects and benefits of allowing a single payload system to be interoperable with a variety of drone manufacturers without changing the operation of the payload system. Still further embodiments provide technical effects and benefits of providing a flexible payload system that can carry one or multiple energetics depending on the goal of the mission. Still further embodiments provide technical effects and benefits of allowing a drone to be used on a mission and returned for reuse or redeployment.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An unmanned vehicle comprising:

a fuselage;

at least one thrust device coupled to the fuselage;

a first payload module having an first attachment plate fixedly coupled to the fuselage, the first attachment plate having an interlock feature, the first payload module further having a first control module removably coupled to the first attachment plate and a first payload having a first energetic element;

a second payload module having an second attachment plate fixedly coupled to the fuselage adjacent the first payload module, the second payload module further having a second control module removably coupled to the second attachment plate and a second payload having a second energetic element;

wherein the first control module further includes a pin arranged to engage the interlock feature and move from a first position to a second position when the first payload module is coupled to the first attachment plate; and wherein the first control module includes an energy source and an electrical circuit that are electrically coupled in response to the movement of the pin from the first position to the second position.

2. An unmanned vehicle comprising:

a fuselage;

at least one thrust device coupled to the fuselage;

a first payload module having an first attachment plate fixedly coupled to the fuselage, the first payload module further having a first control module removably coupled to the first attachment plate and a first payload having a first energetic element;

a second payload module having an second attachment plate fixedly coupled to the fuselage adjacent the first payload module, the second payload module further having a second control module removably coupled to the second attachment plate and a second payload having a second energetic element;

wherein the first control module includes one or more first processors and a first power source, the first control module having a first feature configured to be movable from a first position to a second position when the first control module is coupled to the first attachment plate, the one or more first processors being energized when the first feature is moved from the first position to the second position; and wherein the second control module includes one or more second processors and a second power source, the second control module having a feature configured to be movable from a third position to a fourth position when the second control module is coupled to the second attachment plate, the one or more second processors being energized when the second feature is moved from the third position to the fourth position.

3. The unmanned vehicle of claim 2, wherein the first feature is removable from the first control module when in the second position.

4. The unmanned vehicle of claim 3, wherein the first control module is operably couple to communicate with a control device, the control device being remote from the control module.

5. The unmanned vehicle of claim 4, wherein the first control module further includes a communications circuit that is operably coupled to the one or more processors and is coupled to communicate with the control device.

6. The unmanned vehicle of claim 5, wherein the first control device is coupled to communicate with the communications circuit in response to the second feature being operably coupled to the control device.

7. The unmanned vehicle of claim 5, wherein the first control module further includes a first static arming inhibit element operably coupled to the one or more first processors, the one or more first processors being configures to close the first static arming inhibit element in response to a first signal from the control device.

8. The unmanned vehicle of claim 7, wherein the first control module further includes an electromechanical device operably coupled to the one or more first processors and the first energy source, the electromechanical device being movable from an extended position to a retracted position, the electromechanical device being operably coupled to the attachment plate, the first control module being decoupled from the attachment plate when the electromechanical device is in the retracted position.

9. The unmanned vehicle of claim 8, wherein the first control module is separable from the unmanned vehicle independently of the second control module.

10. The unmanned vehicle of claim 8, wherein the one or more first processors are further configured to close a dynamic arming inhibit element in response to an expiration of a timer, the dynamic arming inhibit element being electrically coupled to the energy source.

11. The unmanned vehicle of claim 10, wherein the first control module includes a high voltage capacitor operably coupled to the dynamic arming inhibit element and to a low energy exploding foil initiator, the low energy exploding foil initiator being electrically coupled between the dynamic arming inhibit and the energetic element.

12. The unmanned vehicle of claim 11, wherein the one or more first processors are further configured to close a firing switch in response to a third signal from the control device, the firing switch being electrically coupled between the high voltage capacitor and the low energy exploding foil initiator.

13. The unmanned vehicle of claim 1, wherein the first energetic element and the second energetic element are one of fragmentary rounds, high explosives, thermite, or shaped charges.

14. The unmanned vehicle of claim 1, further comprising:

a controller configured to wirelessly transmit a signal in response to the pin being operably coupled to the controller;

wherein the electrical circuit includes a communications circuit configured to wirelessly communicate with the controller.

15. The unmanned vehicle of claim 14, wherein the electrical circuit further includes a first static arming inhibit element, the electrical circuit being configured to close the first static arming inhibit element in response to receiving the signal from the control device.

16. The unmanned vehicle of claim 14, wherein the electrical circuit is configured to close a dynamic arming inhibit element in response to an expiration of a timer, the dynamic arming inhibit element being electrically coupled to the energy source.

17. The unmanned vehicle of claim 15, wherein the electrical circuit includes a high voltage capacitor operably coupled to the dynamic arming inhibit element and to a low energy exploding foil initiator, the low energy exploding foil initiator being electrically coupled between the dynamic arming inhibit and the energetic element.

18. The unmanned vehicle of claim 16, wherein the electrical circuit further configured to close a firing switch in response to receiving the signal from the control device, the firing switch being electrically coupled between the high voltage capacitor and the low energy exploding foil initiator.

* * * * *